US011978606B2

(12) United States Patent
Kerim et al.

(10) Patent No.: US 11,978,606 B2
(45) Date of Patent: May 7, 2024

(54) SYSTEMS AND METHODS FOR MODIFYING SOLID-STATE BREAKER OPERATIONS BASED ON LOAD PROFILES

(71) Applicant: ROCKWELL AUTOMATION TECHNOLOGIES, INC., Mayfield Heights, OH (US)

(72) Inventors: Aiman Kerim, Aarau (CH); Juerg Merki, Aarau (CH); Kyle B Adkins, Oak Creek, WI (US); Randall S. Langer, Jr., Oak Creek, WI (US); Andrew E. Carlson, Franklin, WI (US); David Elmiger, Hitzkirch (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 97 days.

(21) Appl. No.: 17/877,218

(22) Filed: Jul. 29, 2022

(65) Prior Publication Data
US 2024/0047161 A1    Feb. 8, 2024

(51) Int. Cl.
  *H01H 71/12* (2006.01)
  *H01H 83/20* (2006.01)
  *H01H 71/00* (2006.01)

(52) U.S. Cl.
  CPC .......... *H01H 71/125* (2013.01); *H01H 83/20* (2013.01); *H01H 2071/006* (2013.01)

(58) Field of Classification Search
  CPC . H01H 71/125; H01H 83/20; H01H 2071/006
  (Continued)

(56) References Cited

U.S. PATENT DOCUMENTS 8,742,767 B2   6/2014  Messersmith et al.
9,880,223 B2   1/2018  Messersmith et al.
(Continued)

FOREIGN PATENT DOCUMENTS

AU   2012216717 A1   5/2013
CN   204407121 U     6/2015

OTHER PUBLICATIONS

Eaton, "Pow-R-Line X General Purpose Distribution Switchboard," https://www.eaton.com/ca/en-GB/catalog/low-voltage-power-distribution-controls-systems/pow-R-line-X-general-purpose-distribution-switchboard.html, accessed Feb. 20, 2020, 22 pages.

(Continued)

*Primary Examiner* — Yemane Mehari
(74) *Attorney, Agent, or Firm* — Fletcher Yoder, P.C.

(57) ABSTRACT

A method includes receiving a first set of operational parameters that correspond to one or more semiconductor devices of a solid-state circuit breaker and sending a first command to the solid-state circuit breaker to turn off the one or more semiconductors in response to the first set of operational parameters exceeding a first set of thresholds. The method includes sending a second command to the solid-state circuit breaker to turn on the one or more semiconductors in response to the first set of operational parameters being equal to or less than the first set of thresholds. The method includes receiving a second set of operational parameters that correspond to one or more electrical properties associated with an operation of the solid-state circuit breaker coupled to a load device and generating a baseline profile representative of the first set of operational parameters and the second operational parameters.

24 Claims, 5 Drawing Sheets

(58) Field of Classification Search
USPC .......................................................... 361/115
See application file for complete search history.

(56) References Cited

U.S. PATENT DOCUMENTS

| | | | |
|---|---|---|---|
| 10,276,321 B2 | 4/2019 | Kennedy et al. | |
| 10,541,530 B2 | 1/2020 | Kennedy et al. | |
| 10,630,069 B2 | 4/2020 | Kennedy et al. | |
| 10,784,061 B2 | 9/2020 | Kennedy et al. | |
| 10,804,692 B2 | 10/2020 | Kennedy et al. | |
| 10,811,867 B2 | 10/2020 | Kennedy et al. | |
| 10,896,790 B2 | 1/2021 | Kennedy et al. | |
| 10,896,791 B2 | 1/2021 | Kennedy et al. | |
| 11,037,749 B2 | 6/2021 | Kouroussis et al. | |
| 11,158,477 B2 | 10/2021 | Mazur et al. | |
| 2003/0205938 A1 | 11/2003 | Andarawis et al. | |
| 2009/0140871 A1 | 6/2009 | Titus et al. | |
| 2013/0070745 A1 | 3/2013 | Nixon et al. | |
| 2017/0075320 A1 | 3/2017 | Day et al. | |
| 2017/0256934 A1 | 9/2017 | Kennedy et al. | |
| 2018/0152022 A1 | 5/2018 | Manson | |
| 2018/0277317 A1 | 9/2018 | Kennedy et al. | |
| 2018/0301294 A1 | 10/2018 | Kennedy et al. | |
| 2019/0157021 A1 | 5/2019 | Kennedy et al. | |
| 2019/0228635 A1 | 7/2019 | Pop | |
| 2019/0341213 A1* | 11/2019 | Kouroussis | H02H 7/26 |
| 2020/0212959 A1 | 7/2020 | Eriksen et al. | |
| 2020/0395739 A1 | 12/2020 | Santore et al. | |
| 2020/0395748 A1 | 12/2020 | Miller et al. | |
| 2021/0066013 A1* | 3/2021 | Kumar | G01R 31/2827 |
| 2021/0126447 A1* | 4/2021 | Miller | H01H 71/58 |
| 2021/0241989 A1 | 8/2021 | Kouroussis et al. | |
| 2021/0265830 A1 | 8/2021 | Mazur et al. | |

OTHER PUBLICATIONS

ABB, "SACE Tmax XT New low voltage moulded-case circuit breakers up to 250 A," Oct. 2015, 346 pages.

Atom Power, https://www.atompower.com, accessed Oct. 17, 2019, 4 pages.

Atom Power, "Products Overview," https://www.atompower.com/atom-power-products-brochure, accessed Oct. 17, 2019, 20 pages.

National Concord Engineering Ltd. "Siemens 3VL MCCB Operation," https://www.youtube.com/watch?v=f41WoyYzZNg, published Jul. 9, 2009.

Partial European Search Report for Application No. 21158152.5 dated Jul. 28, 2021, 15 pages.

Extended European Search Report for Application No. 21158152.5 dated Dec. 3, 2021, 27 pages.

Zhou et al., "A Digital-Controlled SiC-Based Solid State Circuit Breaker with Soft-Start Function for DC Microgrids," Jun. 25-28, 2018, 9th IEEE International Symposium on Power Electronics for Distributed Generation Systems, DOI: 10.1109/PEDG.2018.8447563, pp. 1-7.

* cited by examiner

SYSTEMS AND METHODS FOR MODIFYING SOLID-STATE BREAKER OPERATIONS BASED ON LOAD PROFILES

BACKGROUND

The present disclosure relates generally to operations of circuit breakers in an industrial automation system. More specifically, the disclosure is related to reducing a likelihood of arc flash and/or reduce a severity of exposed incident energy in a solid-state circuit breaker.

In an industrial automation system, solid-state circuit breakers and solid-state hybrid circuit breakers may provide a particular advantage by avoiding the use of mechanical switching to open or close a circuit. Reducing or eliminating use of mechanical switching may reduce a likelihood of arc flash and/or reduce a severity of exposed incident energy if an arc flash were to occur. However, solid-state circuit breakers may struggle with distinguishing between normal, abnormal (overcurrent sequences, voltage sag, loss of a voltage phase, etc), and fault conditions during different load operations. As such, systems and methods directed towards adapting the operations of the solid-state circuit breakers to accommodate a variety of loads may be useful.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

SUMMARY

In one embodiment, a system includes a solid-state circuit breaker to couple between a power supply and an electrical load, one or more sensors to measure one or more properties associated with the solid-state circuit breaker, the electric load, and/or the power supply, and a control system to communicatively couple to the one or more sensors. The control system sends a first signal to the solid-state circuit breaker, where the first signal causes the solid-state circuit breaker to close an airgap disconnector of the solid-state circuit breaker. The control system receives a first set of data from the one or more sensors, sends a second signal to the solid-state circuit breaker, where the second signal causes the solid-state circuit breaker to turn on one or more semiconductors in the solid-state circuit breaker. The control system receives a second set of data from the one or more sensors and generates a baseline profile associated with one or more operations of the electrical load based on the first set of data and the second set of data. The control system receives a third set of data from the one or more sensors, determine that a fault associated with the solid-state circuit breaker, the electric load, and/or the power supply is present based on the baseline profile and the third set of data, and sends a third signal to the solid-state circuit breaker in response to determining that the fault is present, wherein the third signal causes the solid-state circuit breaker to open the airgap disconnector.

In yet another embodiment, a method includes receiving, via at least one processor, a first set of operational parameters that correspond to one or more semiconductor devices of a solid-state circuit breaker and sending, via the at least one processor, a first command to the solid-state circuit breaker in response to the first set of operational parameters exceeding a first set of thresholds, where the first command causes the one or more semiconductor devices to turn off. The method includes sending, via the at least one processor, a second command to the solid-state circuit breaker in response to the first set of operational parameters being equal to or less than the first set of thresholds, where the second command causes the one or more semiconductor devices to turn on. The method includes receiving, via the at least one processor, a second set of operational parameters that correspond to one or more electrical properties associated with an operation of the solid-state circuit breaker coupled to a load device and generating, via the at least one processor, a baseline profile representative of the first set of operational parameters and the second operational parameters.

In a further embodiment, a non-transitory, machine-readable medium, comprising machine-readable instructions that, when executed by one or more processors, cause the one or more processors to receive a baseline profile that corresponds to one or more semiconductor devices of a solid-state circuit breaker and to one or more electrical properties associated with an operation of the solid-state circuit breaker coupled to a load device and receive a first set of operational parameters that correspond to the one or more semiconductor devices of the solid-state circuit breaker. The one or more processors send a first command to the solid-state circuit breaker based on a comparison between the first set of operational parameters and the baseline profile, where the first command causes the one or more semiconductor devices to turn off. The one or more processors send a second command to the solid-state circuit breaker based on the comparison between the first set of operational parameters and the baseline profile, where the second command causes the one or more semiconductor devices to turn on. The one or more processors receive a second set of operational parameters that correspond to the one or more electrical properties associated with the operation of the solid-state circuit breaker coupled to the load device and send a third command to the solid-state circuit breaker based on a comparison between the second set of operational parameters and the baseline profile, where the third command causes the one or more semiconductors devices to turn off.

DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
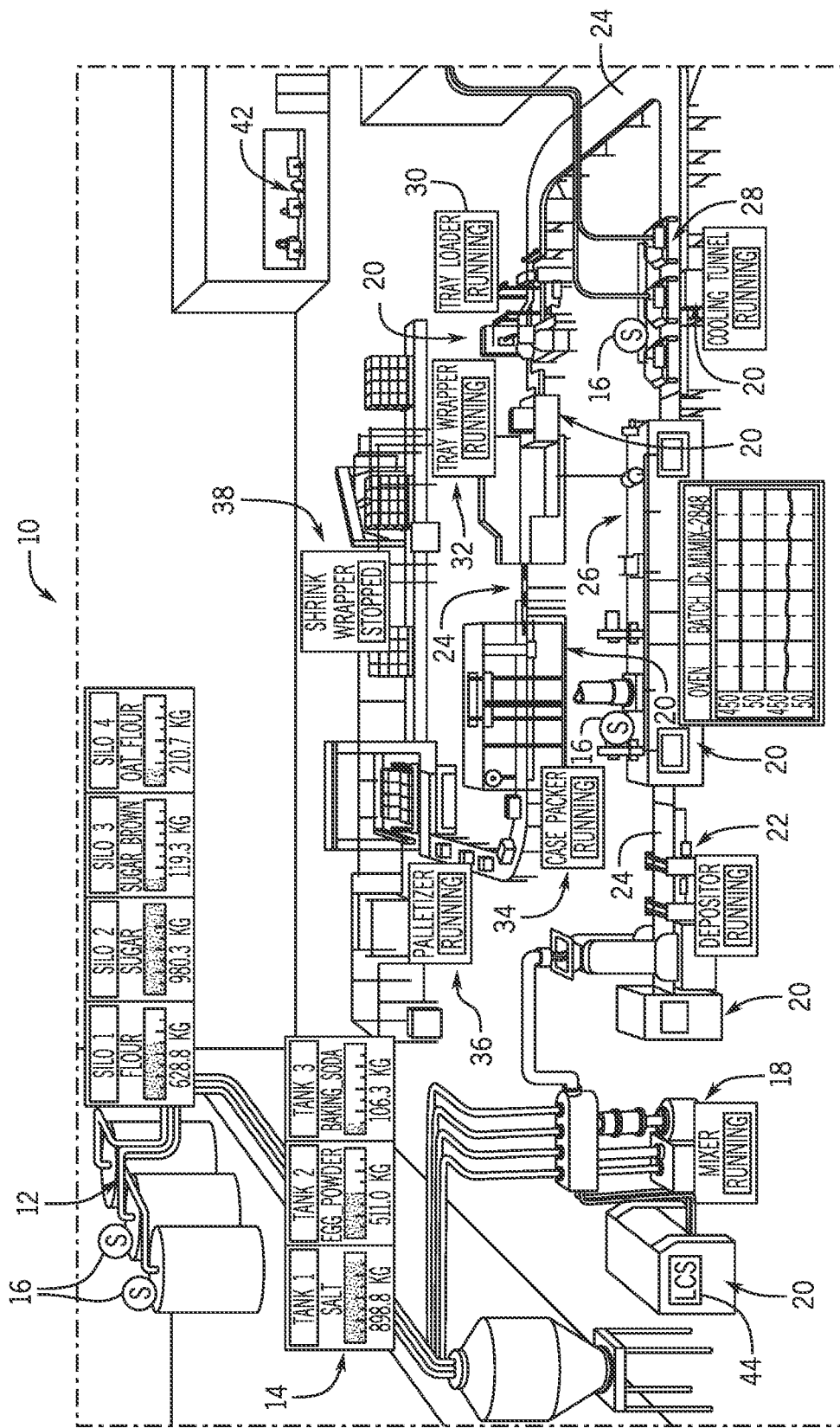
FIG. 1 illustrates an example industrial automation system, in accordance with embodiments presented herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As described above, solid-state circuit breakers and solid-state hybrid circuit breakers in safety systems may provide a particular advantage by avoiding the use of mechanical switching to open or close a circuit. It should be noted that the use of the term solid-state circuit breaker (SSCB) herein may refer to the solid-state circuit breaker and the semiconductor hybrid circuit breakers. Reducing or eliminating use of mechanical switching may reduce a likelihood of arc flash and/or reduce a severity of exposed incident energy if an arc flash were to occur. When occurrences of arc flash are reduced, reliability and lifespans of systems using solid-state circuit breakers may improve (e.g., increase). Furthermore, since a likelihood of arc flash may be eliminated and/or reduced when using a solid-state circuit breaker, operators of solid-state circuit breakers may reduce a level of personal protective equipment (PPE) worn while operating the solid-state circuit breakers, such as the level of PPE worn when restarting (e.g., coupling line-side (or supply-side) to load-side, coupling supply-side to load-side) the SSCB after a trip event of the SSCB.

During the closing sequence of the SSCB, the SSCB may encounter a short circuit event. In traditional breakers, all three phases may be closed simultaneously using three contactors. That is, each contactor corresponding to a phase in a three-phase power system may be closed at the same time. However, each closing contactor may experience different properties or issues (e.g., the short circuit current experienced by the contactor) as compared to other poles. Traditional breakers often accounted for this uncertainty in their design (e.g., clearance) and faced space constraints or limitations based on these design considerations.

With the foregoing in mind, the embodiments described herein may include controlling the individual poles of the SSCB during the closing sequence to coordinate the closing sequences with particular closing times and angles of a respective waveform (e.g., current and/or voltage) that may significantly reduce an amount of available short circuit current for downstream devices during the first half cycle (i.e., before the first current zero cross) for a particular phase. It should be noted that this may apply to both traditional electro-mechanical breakers and SSCBs. That is, in an electro-mechanical breaker, the arc current may be reduced if the contactors can be opened during the first half-cycle of current. However, in the SSCB, the current through the semiconductor before switching off can be significantly reduced and the transient recovery voltage across the semi-conductors may be controlled/minimized since the poles may be closed more quickly in the SSCB, as compared to the electro-mechanical breaker.

With the foregoing in mind, FIG. 1 illustrates an example industrial automation system employed by a food manufacturer in which the present embodiments described herein may be implemented. It should be noted that although the example industrial automation system 10 of FIG. 1 is directed at a food manufacturer, the present embodiments described herein may be employed within any suitable industry, such as automotive, mining, hydrocarbon production, manufacturing, and the like. That is, the following brief description of the example industrial automation system 10 employed by the food manufacturer is provided herein to help facilitate a more comprehensive understanding of how the embodiments described herein may be applied to industrial devices to significantly improve the operations of the respective industrial automation system based on the current configuration of the equipment in the industrial automation system. As such, the embodiments described herein should not be limited to be applied to the example depicted in FIG. 1.

However, solid-state circuit breakers may struggle with distinguishing between normal, abnormal (overcurrent sequences), and fault conditions during different load operations. That is, an overcurrent sequence, which may appear during a motor starting operation, could be misinterpreted as an overcurrent condition resulting in the opening of the solid-state circuit breakers. Additionally, closing the SSCB in case of a capacitive load may also cause to a high inrush current, which may trigger an opening of the SSCB. To insure a safe and credible operation of the SSCB and avoid any false fault conditions, a control system may monitor the load device and circuit and automatically adapt its operations to accommodate a variety of loads based on technology-related parameters and application-related parameters associated with the load, the SSCB, or both.

By way of example, technology-related parameters may be defined according to a safe operating area of the semiconductor technology of the semiconductor technology. In some examples, the safe operating area may specify the thermal limitation (e.g., temperature ratings) of the semiconductor devices in the SSCB and other parameters related to operating the semiconductor technology. For instance, the parameters may include the temperature ratings of the semiconductor and the heatsink, a value, defined by the semiconductor technology, that is the derivative of the thermal limitation current over time (for example, a transistor could maintain double the nominal current within 2-3 μs), a baseplate temperature of the semiconductors (a value between 125-130° C. could be used as a thermal limit for the switch), and the like.

The application-related parameters may be defined according to the load and applied standards. To determine the application related parameters, a first run of the load device via the SSCB for a short time may be performed and the control system may characterize one or more of the application-related parameters and used them as a reference for trip criteria. The application-related parameters may correspond to expected change of current values, expected inrush currents during initialization, nominal current and voltage values, expected changes in electrical properties at various time periods, with respect to other operating devices, and the like. It should be noted that the SSCB may provide limited or basic protection parameters (e.g., technology-related parameters). Following the first run, the control system may determine the application-related parameters, which may a value derived by the control system from the rate of change of the load current (measured di/dt), a current value derived by the control from the load current (measured i), a measured phase difference angle, leakage current, a sum of three-phase voltages, a load impedance, and the like.

As discussed above, the first run may determine the above discussed application-related parameters and the load-profile of the SSCB. Following the first run, the control system may now self-adapt to a respective load profile that based on the known technology related parameters and the determined application related parameters. As such, the control system may compare the technology-related parameters and the application-related parameters during operation to distinguish between normal, abnormal (overcurrent sequences), and fault conditions. Additional details with regard to modifying the operations of the SSCB based on the technology-related parameters and the application-related parameters are described below with reference to FIGS. 1-5.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the example industrial automation system 10 to measure certain properties, such as temperature, mass, volume, pressure, humidity, and the like.

The raw materials be provided to a mixer 18, which may mix the raw materials together according to a specified ratio. The mixer 18 and other machines in the example industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the example industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the example industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may receive data regarding the operation of the respective industrial automation device 20, other industrial automation devices 20, user inputs, and other suitable inputs to control the operations of the respective industrial automation device(s) 20.

The local control system 42 may have access to configuration data associated with the connected industrial automation devices 20. That is, the local control system 42 may include memory or a storage component that stores information concerning the configuration of each industrial automation device 20 connected to it. In some embodiments, the information or configuration data may be populated or input by an operator at the time the respective industrial automation device 20 is installed. Additionally, the local control system 42 may query the connected industrial automation device 20 to retrieve configuration data, such as model number, serial number, firmware revision, assembly profile, and the like. In some embodiments, the supervisory control system 40 may collect configuration data from multiple local control systems 42 and store the information in a suitable memory or storage component.

Figure 2:
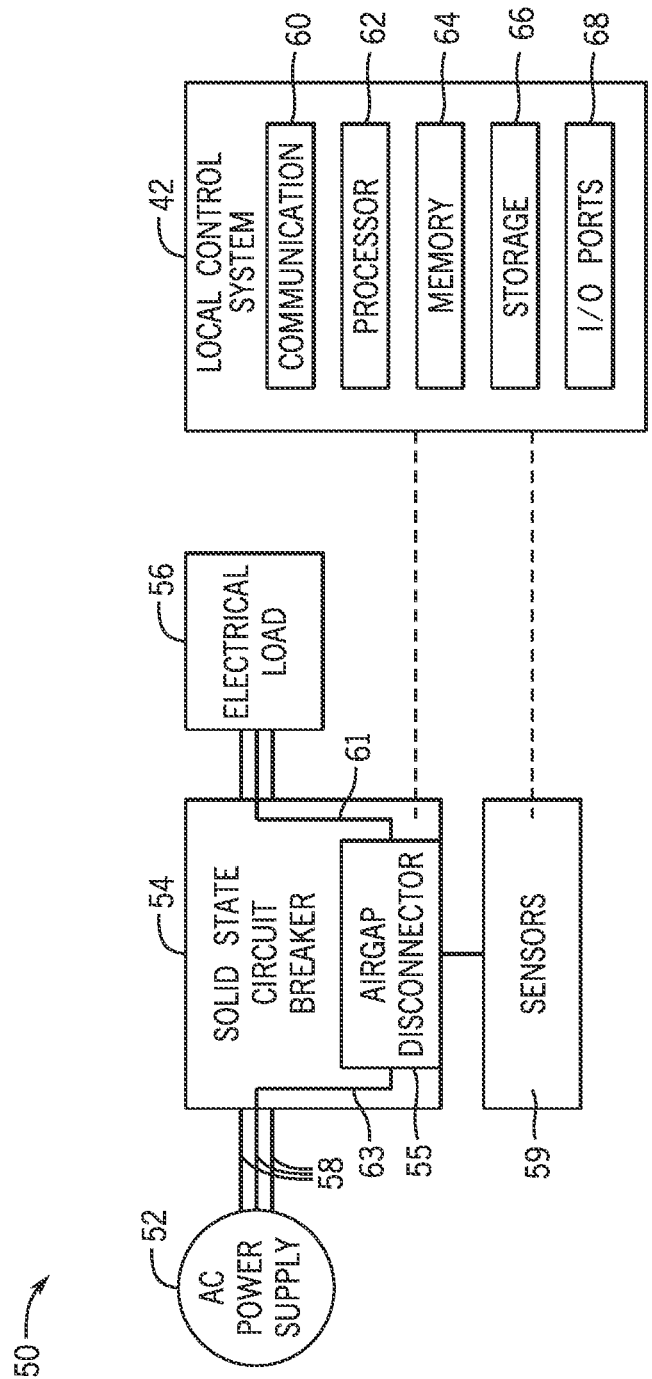
FIG. 2 is a block diagram of a load-feeder system in the industrial automation system of FIG. 1 protected by a solid-state circuit breaker, in accordance with an embodiment.

With the foregoing in mind, FIG. 2 is a block diagram of a feeder system 50 (e.g., motor feeder system, motor control center (MCC) feeder system), which may be part of the industrial automation system 10. The feeder system 50 may include a power supply, such as an alternating current (AC) power supply 52, to supply power to loads coupled downstream. The feeder system 50 may also include one or more solid-state circuit breakers 54 coupled to the AC power supply 52. The AC power supply 52 may supply current and/or voltage to an electrical load 56 coupled to the solid-state circuit breaker 54.

The feeder system 50 may be configured to use one or more solid-state circuit breakers 54 compatible with three-phase (e.g., multi-phase) electrical distribution systems. The solid-state circuit breaker may be used as an independent electrical feeder (e.g., main line) and/or as a motor starter, in combination with additional solid-state circuit breakers as a motor starter, and/or in similar operation as a non-solid-state circuit breaker. As such, the solid-state circuit breaker 54 may be suitable for protection of electrical couplings between the power supply 52 for a motor and the motor (e.g., feeder between a generator and a motor as depicted in FIG. 2), as well as for protection of electrical couplings between an inverter and a motor. When using the solid-state circuit breaker 54 as a motor starter, the solid-state circuit breaker 54 may be operated to perform a reverse starting operation, a non-reverse (e.g., forward) starting operation, a soft-start starting operation (e.g., stepped starting operation), and the like.

In some embodiments, a motor starter that does not implement semiconductor technologies may include three major components: a galvanic disconnecting device with branch circuit protection (e.g., a circuit breaker, fused disconnect switch), a thermal overload protection device (e.g., electronic overload), and an isolating device in the form of a contactor or. These three components work together as a starter assembly for a motor load (e.g., electric motor circuit), such as a full voltage non-reversing starter system. For example, each disconnect switch in a starter may operate at a same time to open or close the electrical circuit to the motor load.

In the feeder system 50, the starter described above (e.g., full voltage non-reversing starter) may be replaced by a starter that uses semiconductors to improve operation of the starter. For example, the electronic overload device and an isolation switch between line-side 63 (e.g., supply-side) and load-side of the above-referenced starter (e.g., contactor functionality) may be embedded within the solid-state circuit breaker 54 as a single component. These components, embedded into the solid-state circuit breaker 54, may eliminate the contactor and overload components.

The solid-state circuit breaker 54 may include an airgap disconnector 55. The airgap disconnector 55 may permit galvanic isolation between line-side 63 and load-side 61 within the solid-state circuit breaker 54, as opposed to in line with the solid-state circuit breaker 54. Control circuitry of the solid-state circuit breaker 54 may utilize the airgap disconnect 55 to perform lockout/tagout control operations. The galvanic isolation protection provided within the solid-state circuit breaker 54 may be further supplemented by including an additional circuit breaker and/or fused disconnect switch upstream of the solid-state circuit breaker 54, such as to further decouple the solid-state circuit breaker 54 from a portion of a circuit. In some cases, the solid-state circuit breaker 54 may be associated with a latch mechanism that interlocks the solid-state circuit breaker 54. Interlocking the solid-state circuit breaker 54 may stop an operator from removing the solid-state circuit breaker 54 while the solid-state circuit breaker 54 is closed. In some embodiments, the solid-state circuit breaker 54 may include a surge suppressor circuit. That is, the surge suppressor circuit may prevent power surges from spikes in voltage and/or current impacting the electrical load 56. The local control system 42 may determine the dissipated energy in the surge suppressor circuit.

In some embodiments, a mechanical device may be included within the solid-state circuit breaker 54 to operate a galvanic disconnecting device within the solid-state circuit breaker 54 additional to or alternative of the latch mechanism and/or the fused disconnect switch. Operating the galvanic disconnecting device into an open position (e.g., such that an air gap is present between metal contactors or poles associated with the line-side 63 and the load-side 61 of the solid-state circuit breaker 54) may provide mechanical galvanic isolation. It is noted that in some cases the galvanic disconnecting device implements or is the integrated air-gap disconnect 55. The mechanical device may be installed and attached to a physical disconnect handle that extends to the outside of a motor control center unit or drawer. Operating the physical disconnect handle to cause the mechanical device to operate the galvanic disconnecting device may provide a way to physically decouple a supply-side from the load-side 61 of the solid-state circuit breaker. Physically decoupling the supply-side from the load-side 61 of the solid-state circuit breaker 54 may reduce a likelihood of arcs occurring during the removal of the solid-state circuit breaker 54 and/or may be desired in certain maintenance operations and/or for unit withdrawal, such as to comply with the various electrical governing bodies standards and/or when additional isolation of the solid-state circuit breaker 54 from an electrical supply is desired.

When abnormal operation occurs, such as when a voltage that is uncharacteristically high or low is delivered to the electrical load 56, the solid-state circuit breaker 54 may electronically disconnect the AC power supply 52 from the electrical load 56. As such, the solid-state circuit breaker 54 may protect the electrical load from supply voltages and/or supply currents that may damage the solid-state circuit breaker 54.

Any suitable number of supply devices may be represented by the AC power supply 52, such as any combination of rectifiers, converters, power banks, generation devices, or the like. It should be understood that the feeder system 50 may include one or more motor-drive systems, motors, MCCs, or the like as the electrical load, or coupled between any of the depicted devices and that the feeder system 50 may include one or more additional components not depicted in FIG. 1.

For example, the feeder system 50 may include any suitable type of power supply that may provide alternating current (AC) power or direct current (DC) power. In some embodiments, the AC power supply 52 may correspond to a variable frequency drive that may include semiconductor-controlled devices, transistor-based (e.g., insulated-gate bipolar transistor (IGBT), metal-oxide semiconductor field-effect transistor (MOSFET), or other suitable devices in which the opening and/or closing of the switch may be controlled using an external signal (e.g., gate signal), which may be provided by the local control system 42. The AC power supply 52 may provide AC supply signals (e.g., AC voltage, AC current, a regulated AC output) on a bus 58, which may be provided to the solid-state circuit breaker 54.

It is noted that the feeder system 50 may be used in a variety of industrial automation systems, such as food manufacturing, industrial operations systems, refineries, or the like. In this way, implementation and use of the solid-state circuit breaker 54 to protect various electrical loads may improve operations of industrial automation systems. For example, using the solid-state circuit breaker 54 described herein may reduce or eliminate usage of electrical protection devices that rely at least partially on mechanical switching. Reducing or eliminating use of mechanical switching may reduce a likelihood of arc flash and/or reduce a severity of exposed incident energy if an arc flash were to occur. When occurrences of arc flash are reduced, reliability and lifespans of systems using solid-state circuit breakers 54 may improve (e.g., increase) and operators may reduce a level of personal protective equipment (PPE) worn while operating nearby to the solid-state circuit breaker 54.

The solid-state circuit breaker 54 may be coupled to one or more sensors 59. The one or more sensors 59 may include temperature sensors, current sensors, resistance sensors, voltage sensors, or any other viable sensor that may detect and/or record data about the solid-state circuit breaker 54. The temperature sensor may include a thermistor, a thermocouple, a resistance temperature detector, or any other temperature sensor suitable for detecting temperature of the solid-state circuit breaker 54. In some embodiments, the one or more sensors 59 may be coupled to the bus 58.

Industrial automation systems may operate in response to signals generated by the local control system 42, which may be part of the solid-state circuit breaker 54 or a separate unit. It should be noted that the local control system 42 may be disposed in the solid-state circuit breaker 54. The local control system 42 may include any suitable number of electronic devices and/or components to generate and/or manage generation of the control signals. For example, the local control system 42 may include a communication component 60, a processor 62, a memory 64, storage 66, and input/output (110) ports 68, or the like, for generating and managing generation of control signals.

The communication component 60 may be a wireless or wired communication component that facilitates communication between the local control system 42, the solid-state circuit breaker 54, or other suitable electronic devices. The processor 62 may be any type of computer processor or microprocessor capable of executing computer-executable code. The memory 64 and the storage 66 may be any suitable articles of manufacture that may serve as media to store processor-executable code, data, or the like. These articles of manufacture may represent computer-readable media (i.e., any suitable form of memory or storage) that may store the processor-executable code used by the processor 62 to perform the presently disclosed techniques, such as to predictively response to operational changes, or the like.

The 110 ports 68 may couple to the one or more sensors 59, one or more input devices, one or more displays, or the like, to facilitate human or machine interaction with the local control system 42, the solid-state circuit breaker 54, or other suitable electronic devices. For example, based on a notification provided to the operator via a display, the operator may use an input device to instruct the adjustment of a parameter associated with the solid-state circuit breaker 54.

Keeping the foregoing in mind, sometimes the local control system 42 may communicate with the solid-state circuit breaker 54 using one or more communication techniques. For example, the solid-state circuit breaker 54 may include a controller area network (CAN) communicative coupling and/or an internet protocol (IP)-based communicative coupling, such as an Ethernet IP communicative coupling, to the local control system 42. These communicative couplings may enable the solid-state circuit breaker 54 to communicate with the local control system 42 without intervention from a host computer. Thus, the solid-state circuit breaker 54 may communicate directly with the local control system 42 without using an intervening computing device.

In some cases, the local control system 42 may use one or more configuration interfaces to communicate with the solid-state circuit breaker 54. The configuration interface may be a graphical user interface and/or logically defined data object (e.g., data table) that permits the local control system 42 and/or user to provide and/or update a configuration and/or to obtain a status of the solid-state circuit breaker. In this way, the configuration interface may be a data boundary used to translate configurations from devices external to the solid-state circuit breaker 54 to a format readable by the solid-state circuit breaker 54 and/or to translate statuses from the solid-state circuit breaker 54 into a format readable by devices external to the solid-state circuit breaker 54.

With this in mind, the local control system 42 may use the configuration interface-based communication techniques to instruct the solid-state circuit breaker 54 into a particular mode of operation. The mode of operation may define how signals are transmitted through or from the solid-state circuit breaker 54. For example, the solid-state circuit breaker 54 may be instructed into a soft-start operational mode, a forward operational mode, and/or a reverse operational mode, and thus may behave like a motor starter. In some cases, the solid-state circuit breaker 54 may be operated in combination with one or more additional solid-state circuit breakers also operated into the same operational mode. The soft-start operational mode may cause the solid-state circuit breaker 54 to provide incrementally generated supply power or supply signals to the electrical load 56, such as to provide a start-up level of supply signals at a relatively gradual pacing or timing. The forward operational mode may cause the solid-state circuit breaker 54 to provide supply power in a way to cause the electrical load to operate in a forward direction relative to a reference direction, while the reverse operational mode may cause the solid-state circuit breaker 54 to provide supply power in a way as to cause the electrical load to operate in a reverse direction relative to the reference direction.

The local control system 42 may also permit configuration of properties of the solid-state circuit breaker 54 based at least in part on thermal measurements and/or metering information, such as phase-phase voltages, phase-to-ground voltages, input current, output current, frequency, power, status of the solid-state circuit breaker 54 (e.g., Open, Close, and Standby), or the like. In this way, the local control system 42 may determine a current operation of the solid-state circuit breaker 54 and use the information of the current operation to determine how to adjust an operation of the solid-state circuit breaker 54. For example, the local control system 42 may determine that the solid-state circuit breaker 54 is blocked and has a thermal measurement higher than a historical average for the solid-state circuit breaker 54. Using this information, the local control system 42 may determine that an undesired operation is occurring, and thus may determine to open the solid-state circuit breaker 54. Furthermore, the local control system 42 may use this information to operate other devices upstream and/or downstream of the solid-state circuit breaker 54, such as controlling additional protection circuitry to further isolate the solid-state circuit breaker 54 from the industrial automation system.

The properties, in some embodiments, may also be used to define operation limits corresponding to determined settings to be used to protect the load. The operation limits may correspond to operating ranges set by governing agencies or standard committees, such as American National Standards Institute (ANSI®), Underwriters Laboratories (UL®), International Electrotechnical Commission (IEC®) or the like and may be used to protect the solid-state circuit breaker 54, the electrical load 56, or the like from undesired operating conditions. Furthermore, the properties may also define protection groups or classes associated with the solid-state circuit breaker 54. Protection groups or classes may correspond to groups of electrical loads 56 that may have a same protection scheme. These protection groups or classes may be classifications of types of protection for different devices set by governing agencies or standard committees. When the electrical load 56 is classified as part of a protection group with another electrical load 56, it may be desired to protect both electrical loads 56 with a solid-state circuit breaker 54 set to the same settings. In this way, when a different electrical load 56 is installed to the solid-state circuit breaker 54, the protection groups or classes may be updated to indicate the new group or class of the new electrical load 56.

This may cause the solid-state circuit breaker 54 to automatically update its operational settings to accommodate the new electrical load 56. Use of properties may thus improve deployment of setting changes to solid-state circuit breakers 54 by making an overall installation process of a new electrical load 56 relatively faster since less time is spent updating operational settings of the solid-state circuit breaker 54. In some embodiments, the solid-state circuit breaker 54 may detect a protection group or class of its electrical load 56 automatically and/or without receiving the property from the local control system 42. In these cases, the solid-state circuit breaker 54 may sense metering information (e.g., operational properties) of the electrical load 56 to determine what protection group or class applies to the electrical load 56. For example, the solid-state circuit breaker 54 may determine that it outputs three-phase power and that its load is operating at a relatively high voltage that corresponds to an operating voltage of a large motor load, thus the solid-state circuit breaker 54 may automatically classify its electrical load 56 as a large motor based on this analysis.

In some cases, the local control system 42 may use configuration interface techniques to receive thermal measurements and/or metering information directly from the solid-state circuit breaker 54. For example, the solid-state circuit breaker 54 may directly report values sensed by one or more measurement circuitries coupled to one or more portions of the solid-state circuit breaker 54 via updating of data stored in a table, data object, or the like, associated with the configuration interface between the solid-state circuit breaker 54 and the local control system 42. As such, the solid-state circuit breaker 54 may report its sensed values including, but not limited to, ambient temperature, internal temperature, phase-to-phase voltage, internal voltage, phase-to-line voltage, current, frequency, power input, power output, or the like. Furthermore, in some cases, the solid-state circuit breaker 54 may report its status, such as whether it is operated in an open state (e.g., Open status), a closed state (e.g., Closed status), whether its closing/opening function is blocked and/or functionally prevented (e.g., Blocked status), whether its air gap disconnector is closed and the one or more semiconductors are turned off (e.g., standby) and/or whether the solid-state circuit breaker 54 is non-operational and/or uncommunicative (e.g., offline) in the same data object associated with the configuration interface.

These various statuses, control operations, and other datasets may be communicated between the local control system 42 and the solid-state circuit breaker 54 using any suitable communication or programming technique. For example, additional devices, such as the local control system 42, may interface in real-time with the solid-state circuit breaker 54 using direct IEC® 61131 programming techniques and/or supporting programming languages, such as structured text, ladder logic, sequential function chart, functional block programming, or the like. It is noted that in some cases, the solid-state circuit breaker 54 may retain and/or generate an information log (e.g., such as within the storage 66) that may be reported to at a later time to the local control system 42. The information log may store and/or track various alarm states, alerts, operations, sensed values, statuses, or the like generated by the solid-state circuit breaker 54.

It should be noted that the solid-state circuit breaker 54 may be associated with one or more technology-related parameters. That is, the technology-related parameters are defined according to the semiconductor technology and the temperature ratings of the solid-state circuit breaker 54. Exceeding any of these parameters may lead to an instantaneous trip of the solid-state circuit breaker 54. The one or more technology-related parameters may include: a breakdown voltage, a first current threshold $I_{max2}$, a second current threshold $di_{m2}/dt$, a maximum allowed junction temperature, and/or a maximum baseplate temperature of the one or more semiconductors $T_{bpmax}$. The first current threshold $I_{max2}$ may be defined based on a temperature rating of the one or more semiconductors and one or more respective heatsinks associated with the one or more semiconductors. The second current threshold $di_{m2}/dt$ may be defined by the semiconductor technology. By way of example, a SiC transistor may withstand double nominal current within 2-3 microseconds. The maximum baseplate temperature of the one or more semiconductors $T_{bpmax}$ may be the thermal limit for the one or more semiconductors. In some embodiments, the baseplate temperature $T_{bpmax}$ may be between 150 Celsius (C) and 100° C., such as between 140° C. and 110° C., or between 130° C. and 120° C., such as 125° C.

In some embodiments, the local control system 42 may perform a self-diagnostic on the solid-state circuit breaker 54 and the electrical load 56 to determine a lifetime of the solid-state circuit breaker 54. That is, the local control system 42 may indicate when the solid-state circuit breaker 54 is near the end of the lifetime and send a notification to replace the solid-state circuit breaker 54. The local control system 42 may additionally identify one or more characteristics of the electrical load 56. The one or more characteristics may include an insulation of the local control system 42, one or more electrical properties (e.g., current, voltage, resistance, impedance), or any additional characteristics.

Furthermore, the solid-state circuit breaker 54 may be associated with one or more application-related parameters. That is, the application-related parameters may be defined according to a load and particular applied standards, such as allowed overcurrent, allowed maximum temperature, and/or allowed maximum voltage. By using an adaptive control via the local control system 42, the load parameters (e.g., nominal load current $i_L$, nominal load voltage, power factor, load type (inductive, capacitive)) may be identified and registered. The application-related parameters may be adapted according to identified load parameters to ensure a reliable protection and distinguishing between normal, abnormal, and faulty conditions. Furthermore, the application related parameters may be used to turn on and turn off the solid-state circuit breaker 54 such that the solid-state circuit breaker 54 receives no voltage or current. In some embodiments, exceeding any of the one or more application related parameters may not lead to instantaneous trip of the solid-state circuit breaker 54.

Figure 3:
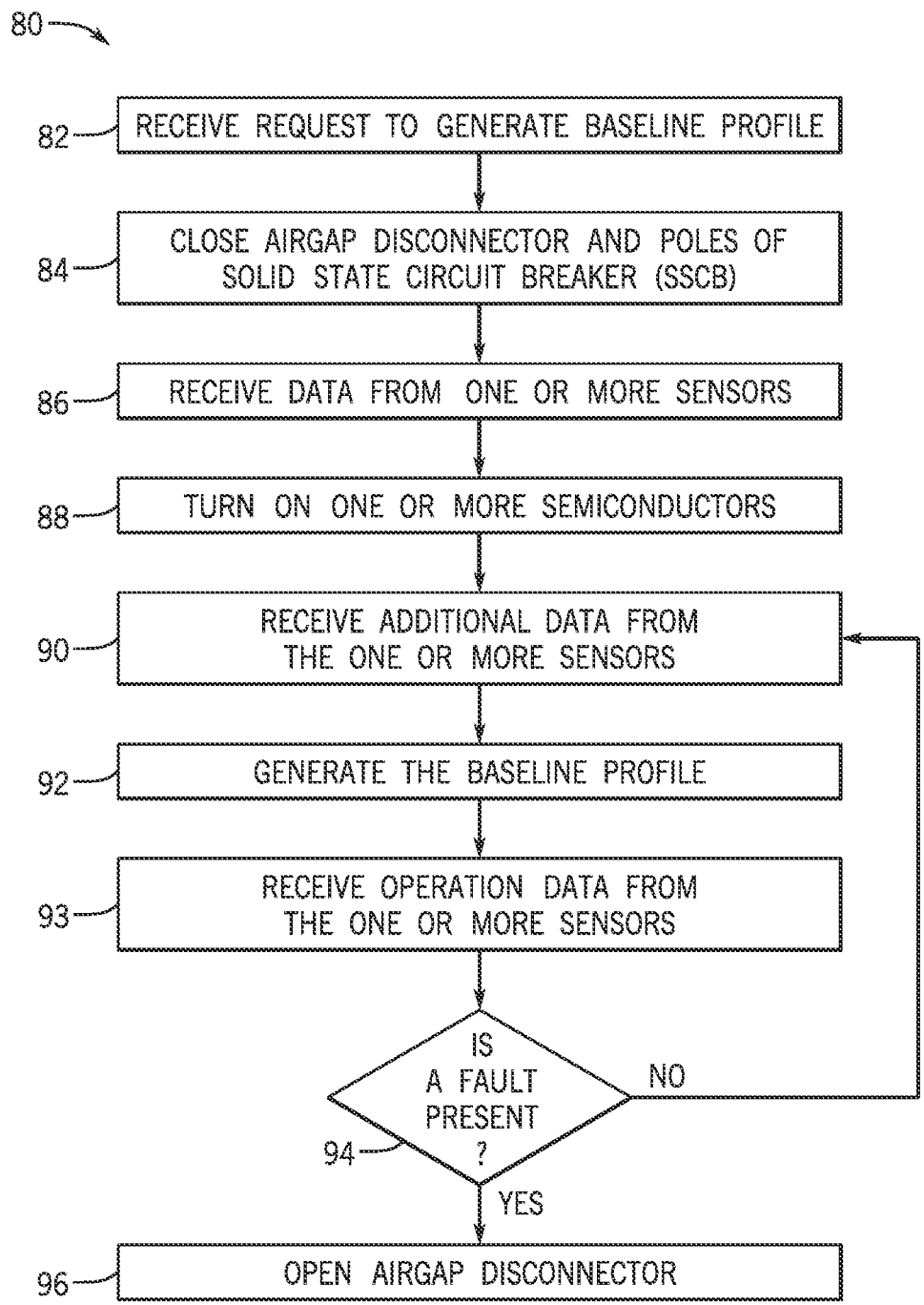
FIG. 3 illustrates a flowchart of a method for generate a baseline profile or a load connected to a solid-state circuit breaker (SSCB) of the industrial automation system, in accordance with an embodiment.

With the foregoing in mind, FIG. 3 illustrates a flowchart of a method 80 for generating a baseline profile of the solid-state circuit breaker 54. The baseline profile may include the one or more application-related parameters and the one or more technology-related parameters. The baseline profile may be based on a load coupled to the solid-state circuit breaker 54. Any suitable component that may control the components of the local control system 42 and/or the solid-state circuit breaker 54, such as the processor 62, may perform the method 80. In some embodiments, the method 80 may be implemented by executing instructions stored in a tangible, non-transitory, computer-readable medium, such as the memory 64 or storage 66, using the processor 62. While the method 80 is described using steps in a specific sequence, it should be understood that the present disclosure contemplates that the described steps may be performed in different sequences than the sequence illustrated, and certain described steps may be skipped or not performed altogether.

At block 82, the local control system 42 may receive a request to generate the baseline profile of the solid-state circuit breaker 54. The local control system 42 may receive the request from the supervisory control system 40 and/or any electronic devices coupled to the local control system 42. In some embodiments, the local control system 42 may generate the request based on detecting the presence of a solid-state circuit breaker 54. That is, the solid-state circuit breaker 54 may be introduced into the industrial automation system 10 and may trigger the generation of the request to generate the baseline profile. Additionally, the local control system 42 may generate the request at regular intervals (e.g., daily, weekly, monthly, and yearly, etc.). Furthermore, the local control system 42 may generate the request following an event, such as a fault and/or shutdown of the industrial automation system 10.

At block 84, the local control system 42 may send a signal to close the airgap disconnector and one or more poles of the solid-state circuit breaker 54. The airgap disconnector 55 of the solid-state circuit breaker 54 may close the circuit and allow the industrial automation system 10 to function as normal. In some embodiments, the airgap disconnector 55 may be manually closed. As discussed above, the airgap disconnector 55 may permit galvanic isolation between line-side 63 and load-side 61 within the solid-state circuit breaker 54 as opposed to in line with the solid-state circuit breaker 54.

At block 86, the local control system 42 may receive data from the one or more sensors 59. The data from the one or more sensors 59 may include current data, voltage data, resistance data, temperature data, and/or any additional relevant data associated with the solid-state circuit breaker 54. The data from the one or more sensors 59 may include the one or more technology-related parameters. The data may be stored in the memory 64 and/or the storage 66.

At block 88, the local control system 42 may send a signal to turn on one or more semiconductors in the solid-state circuit breaker 54. The local control system 42 may generate the signal to turn on the one or more semiconductors based on the request to generate the baseline profile. Additionally, the local control system 42 may generate the signal to turn on the one or more semiconductors prior to and/or following receiving the data from the one or more sensors 59. The local control system 42 may determine dissipated energy from the one or more semiconductors during the turn on sequence.

At block 90, the local control system 42 may receive additional data from the one or more sensors 59. The local control system 42 may receive additional data after the one or more semiconductors are turned on. The additional data from the one or more sensors 59 may include current data, voltage data, resistance data, temperature data, and/or any additional relevant data associated with the solid-state circuit breaker 54. The additional data from the one or more sensors 59 may be associated with the one or more application-related parameters.

At block 92, the local control system 42 may generate the baseline profile that characterizes the operating ranges of the devices and measurements received at blocks 86 and 90 over a period of time. The method 80 may be performed during an initialization, commissioning, or normal operational process to capture the expected behavior of the SSCB 54 while connected to a particular load. That is, the baseline profile may provide an expected range of operation for a particular load profile.

At block 93, the local control system 42 may receive operation data from the one or more sensors. The operation data may be associated with operation of the solid-state circuit breaker 54. That is, the operation data may include temperature data, current data, voltage data, impedance data, and any other additional data associated with the solid-state circuit breaker 54 and a load coupled to the solid-state circuit breaker 54 during operation.

At block 94, the local control system 42 may determine if a fault is present in the industrial automation system 10. The local control system 42 may receive an indication that the fault is present from one or more components in the industrial automation system 10. That is, the local control system 42 may compare the baseline profile with the operation data t determine if there are any discrepancies. Furthermore, the local control system 42 may detect when one or more components in the industrial automation system 10 are not performing their respective functions correctly. In some embodiments, the local control system 42 may detect abnormal data from one or more components downstream and/or upstream from the solid-state circuit breaker 54. Abnormal data, as described herein, may include data that is above or below a threshold, outside an expected range, or both. As such, the abnormal data may include abnormal current data, abnormal voltage data, and/or abnormal temperature data. In some embodiments, the abnormal data may be associated with an internal fault in one or more industrial automation devices 20.

At block 96, the local control system 42 may determine that the fault is present in the industrial automation system 10 and may send a signal to the solid-state circuit breaker 54 to open the airgap disconnector 55. The local control system 42 may automatically generate the signal to instruct the solid-state circuit breaker 54 to open the airgap disconnector 55 upon receiving indication of the fault in the one or more components of the industrial automation system 10. By opening the airgap disconnector 55, the galvanic isolation between the line-side 63 and load-side 61 may halt and current may stop flowing through the solid-state circuit breaker 54.

As discussed above, the solid-state circuit breaker 54 may be associated with the baseline profile to adapt to any load and/or conditions in the industrial automation system 10. The baseline profile may include the one or more technology-related parameters and the one or more application-related parameters. The one or more application-related parameters may be determined by the local control system 42 during an initial run of the solid-state circuit breaker 54. In some embodiments, the application-related parameters may be updated by the local control system 42.

Figure 4:
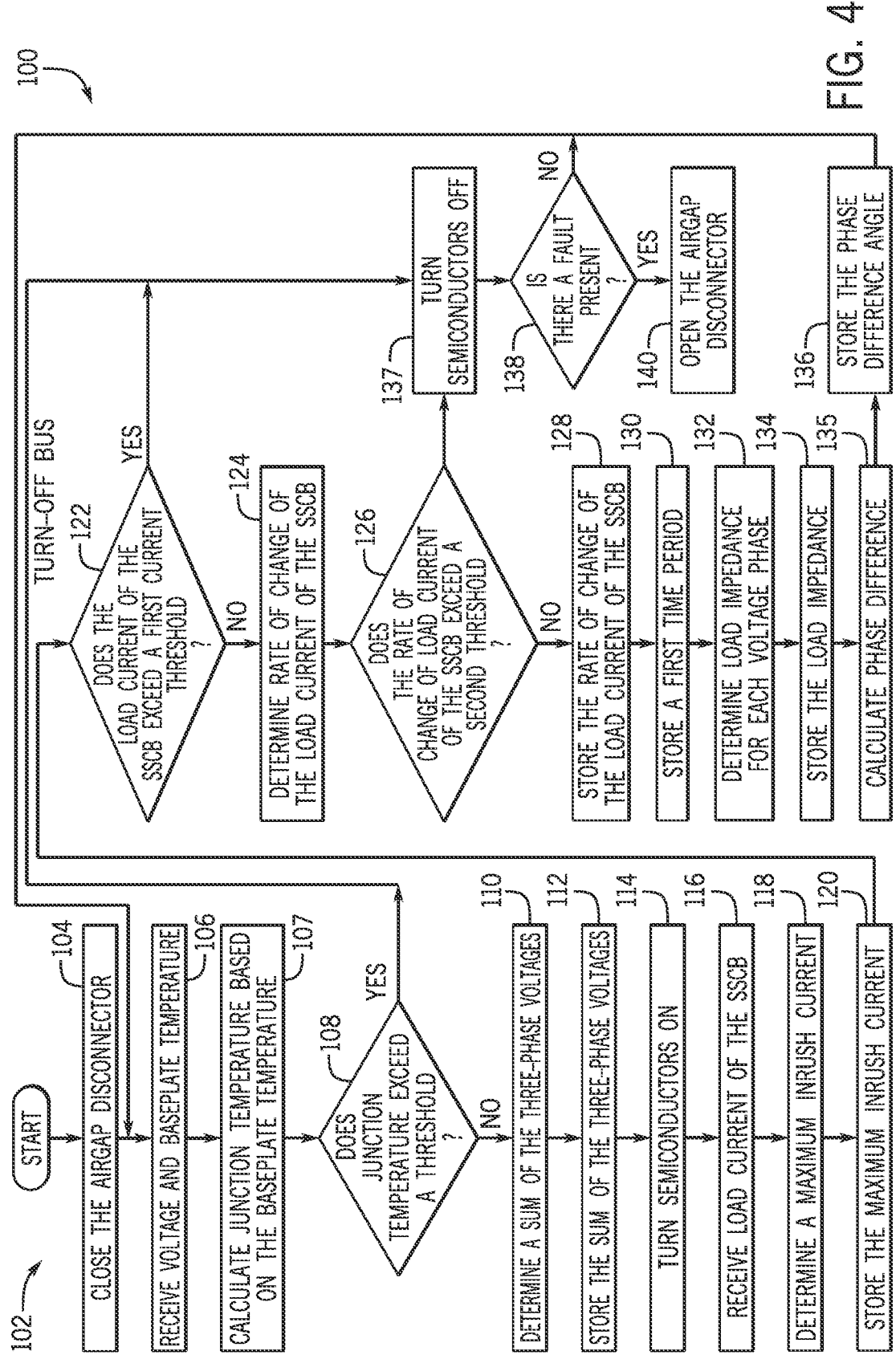
FIG. 4 illustrates a more detailed flowchart of a method for generating the baseline profile of the solid-state circuit breaker, in accordance with an embodiment.

With the foregoing in mind, FIG. 4 illustrates a more detailed flowchart of a method 100 for generating the baseline profile of the solid-state circuit breaker 54. Any suitable component that may control the components of the local control system 42 and/or the solid-state circuit breaker 54, such as the processor 62, may perform the method 100. In some embodiments, the method 100 may be implemented by executing instructions stored in a tangible, non-transitory, computer-readable medium, such as the memory 64 or storage 66, using the processor 62. While the method 100 is described using steps in a specific sequence, it should be understood that the present disclosure contemplates that the described steps may be performed in different sequences than the sequence illustrated, and certain described steps may be skipped or not performed altogether. It should also be understood that the parameters used in the method 100 are exemplary and different parameters may be used as described herein.

At block 102, the local control system 42 may receive the request to generate the baseline profile of the solid-state circuit breaker 54. As discussed above, the local control system 42 may receive the request from the supervisory control system 40 and/or any electronic devices coupled to the local control system 42. In some embodiments, the local control system 42 may generate the request based on detecting the insertion of solid-state circuit breaker 54 into the industrial automation system 10. That is, the solid-state circuit breaker 54 may be introduced into the industrial automation system 10 and may trigger the generation of the request. Additionally, the local control system 42 may generate the request at regular intervals (e.g., daily, weekly, monthly, and yearly, etc.). Furthermore, the local control system 42 may generate the request following an event, such as a fault and/or shutdown of the industrial automation system 10.

At block 104, the local control system 42 may send a signal to close an airgap disconnector of the solid-state circuit breaker 54. As discussed above, the airgap disconnector 55 of the solid-state circuit breaker 54 may close the circuit and allow current to flow through the solid-state circuit breaker 54. As discussed above, the airgap disconnector 55 may permit galvanic isolation between line-side 63 and load-side 61 within the solid-state circuit breaker 54 as opposed to in line with the solid-state circuit breaker 54.

At block 106, the local control system 42 may receive a voltage u and a baseplate temperature $T_{bp}$ of the solid-state circuit breaker 54. The local control system 42 may receive the voltage u and the baseplate temperature $T_{bp}$ via the one or more sensors 59 that are coupled to the solid-state circuit breaker 54. That is, the one or more sensors 59 may be coupled to one or more components of the solid-state circuit breaker 54 and/or the bus 58 to receive the voltage u and/or the baseplate temperature $T_{bp}$.

At block 107, the local control system 42 may determine a junction temperature $T_j$ based on the baseplate temperature $T_{bp}$ of the solid-state circuit breaker 54. The local control system 42 may continuously determine the junction temperature $T_j$ during the method 100. That is, in order to keep the one or more semiconductors in the safe operating area, the junction temperature $T_j$ may be continuously determined. The junction temperature $T_j$ is based upon the measurement of the baseplate temperature $T_{bp}$ and a thermal impedance between the baseplate and the junction.

At block 108, the local control system 42 may determine if the junction temperature T 1 exceeds a temperature threshold. That is, the temperature threshold may be the maximum junction temperature $T_{jmax}$. The local control system 42 may compare the junction temperature $T_j$ to the maximum junction temperature $T_{jmax}$. In some embodiments, the temperature threshold $T_{jmax}$ may be updated by the local control system 42. By way of example, as the one or more semiconductors age, the properties of the one or more semiconductors may change and thus the temperature threshold $T_{jmax}$ may be updated to reflect the aging of the one or more semiconductors.

At block 110, the local control system 42 may determine that the baseplate temperature does not exceed the temperature threshold and may determine a voltage threshold of the solid-state circuit breaker 54. In some embodiments, the voltage threshold may be a sum of three-phase voltages $\Delta u_{cmax}$. Ideally, the sum of three-phase voltages $\Delta u_{cmax}$, should be equal to 0. That is, the sum of instantaneous voltage in a three-phase voltage system should be equal to 0. Each phase voltage in the three-phase voltages may be determined by detecting the voltage at each pole in the solid-state circuit breaker 54. That is, each pole in the solid-state circuit breaker 54 may be associated with a particular phase in the three-phase voltage. As such, the sum of three-phase voltages $\Delta u_{cmax}$, may be determined by summing up the voltages at each pole. At block 112, the local control system 42 may store the sum of the three-phase voltages of the solid-state circuit breaker 54. In some embodiments, the local control system 42 may store the sum in the memory 64 and/or the storage 66.

At block 114, the local control system 42 may send a signal to turn on the one or more semiconductors of the solid-state circuit breaker 54. As discussed above, the one or more semiconductors may be used by the starter to facilitate starting one or more motors in one or more industrial automation devices 20 in the industrial automation system 10. The local control system 42 may determine dissipated energy from the one or more semiconductors during the turn on sequence. At block 116, the local control system 42 may receive a load current i of the solid-state circuit breaker 54. That is, the local control system 42 may receive the current flowing into the solid-state circuit breaker 54 via the load-side 61 from the electrical load 56 coupled to the solid-state circuit breaker 54, where the electrical load 56 may be one or more components (e.g., industrial automation devices 20 of the industrial automation system 10.) The one or more sensors 59 coupled to the solid-state circuit breaker 54 may detect the load current i.

At block 118, the local control system 42 may determine a sum of the load current i and a sum of the three phase system currents ($\Delta i_{cmax}$ and/or maximum inrush current of the solid-state circuit breaker 54. The local control system 42 may determine the maximum inrush current and/or the $\Delta i_{cmax}$ based on data from the one or more sensors 59. The maximum inrush current and/or the $\Delta i_{cmax}$ may be the maximum current allowed through the solid-state circuit breaker 54 during an initial start-up when the one or more semiconductors are turned on before damage may occur at downstream components coupled to the solid-state circuit breaker 54. That is, there may be an excessive amount of current flowing from the power supply 52 when the load-side 61 and the line side 63 are connected. As such, inrush current greater than the determine the maximum inrush current and/or the $\Delta i_{cmax}$ may lead to a trip in the solid-state circuit breaker 54. At block 120, the local control system 42 may store the maximum inrush current and/or the sum of currents greater than a maximum sum threshold $\Delta i_{cmax}$ of the solid-state circuit breaker 54. The local control system 42 may store the maximum inrush current and/or the $\Delta i_{cmax}$ in the memory 64 and/or the storage 66.

At block 122, the local control system 42 may determine if the load current i of the solid-state circuit breaker 54 exceeds the first current threshold $I_{max2}$. As discussed above, the first current threshold may be defined by the safe operating area of the semiconductors as discussed above. That is, the first current threshold may be a predetermined value based on the properties of the one or more semiconductors.

At block 124, the local control system 42 may determine that the load current of the solid-state circuit breaker 54 does not exceed the first current threshold and may determine a rate of change of the load current $d_{ic}/dt$ of the solid-state circuit breaker 54. The rate of change of the load current $d_{ic}/dt$ may be the change of the load current over a period of time. At block 126, the local control system 42 may determine if the rate of load current of the solid-state circuit breaker 54 exceeds the second current threshold $di_{m2}/dt$. As discussed above, the second current threshold $di_{m2}/dt$ may be defined by the safe operating area discussed above.

At block 128, the local control system 42 may determine that the rate of change of the load current $d_{ic}/dt$ does not exceed the second current threshold $di_{m2}/dt$ and may store the rate of change of the load current $d_{ic}/dt$. The local control system 42 may store the rate of change of the load current $d_{ic}/dt$ in the memory 64 and/or the storage 66. In some embodiments, the local control system 42 may update the rate of change of the load current $d_{ic}/dt$ as a new load is detected and/or there is a change in the load current i.

At block 130, the local control system 42 may store a first threshold time period $\Delta t_{m1}$ The solid-state circuit breaker 54 may trip when the rate of change of the load current $d_{ic}/dt$ is exceeding the second current threshold for the first threshold time period. In some embodiments, the first threshold time period $\Delta t_{m1}$ may be between 200 microseonds (μs) and 50 μs, between 150 μs and μs, between 125 μs and 90 μs, such as 100 μs At block 132, the local control system 42 may determine a load impedance threshold $Z_{cmin}$ for each voltage phase of the three-phase voltage. Load impedance present when one or more components coupled to the solid-state circuit breaker 54 includes additional elements (e.g., inductive elements, capacitive elements) other than resistive elements. As such, it is important to determine the load impedance threshold $Z_{cmin}$ in each phase in the three-phase voltage system such that it may be detected if expected load impedance from the electrical load 56 coupled to the solid-state circuit breaker 54 (e.g., the load impedance threshold $Z_{cmin}$) changes unexpectedly. In a single-phase system, the load impedance threshold $Z_{cmin}$ may be determined by the Equation 1 below:

$$Z_{cmin\_LN} = \frac{U_{LN}}{I_L} \text{(single phase system)} \quad \text{Equation 1}$$

As such, the load impedance thresholds $Z_{cmin}$ for each phase may be determined by the Equation 2 below:

$$Z_{cmin\_L1} = \frac{U_{L1}}{I_{L1}} \quad \text{Equation 2}$$
$$Z_{cmin_{L2}} = \frac{U_{L2}}{I_{L2}}$$
$$Z_{cmin_{L2}} = \frac{U_{L2}}{I_{L2}}$$

At block 134, the local control system 42 may store the load impedance threshold $Z_{cmin}$ for each voltage phase of the three-phase voltage. The local control system 42 may store the load impedance threshold $Z_{cmin}$ for each voltage phase of the three-phase voltage in the memory 64 and/or the storage 66. In some embodiments, the local control system 42 may update the load impedance threshold $Z_{cmin}$ for each voltage phase of the three-phase voltage as one or more new components are coupled to the solid-state circuit breaker 54.

At block 135, the local control system 42 may determine a phase difference angle $\varphi_m$ between the one or more semiconductors. By determining the phase difference angle $\varphi_m$, the one or more semiconductors of the solid-state circuit breaker 54 may be synchronized to turn off and turn on each semiconductor at an optimal point on the wave of the three-phase power system. At block 136, the local control system 42 store the phase difference angle $\varphi_m$. The local control system 42 may store the phase difference angle $\varphi_m$ for each semiconductor in the memory 64 and/or the storage 66. In some embodiments, the local control system 42 may update the phase difference angle $\varphi_m$ for each semiconductor as one or more new components are coupled to the solid-state circuit breaker 54.

At block 137, the local control system 42 may determine that the load current i of the solid-state circuit breaker 54 exceeds the first current threshold $I_{max2}$ and may turn off the one or more semiconductors of the solid-state circuit breaker 54. The local control system 42 may determine dissipated energy from the one or more semiconductors during the turn off sequence. In some embodiments, the local control system 42 may determine that the rate of load current $d_{ic}/dt$ of the solid-state circuit breaker 54 exceeds the second rate of current threshold $di_{m2}/dt$ and may turn off the semiconductors of the solid-state circuit breaker 54. In other embodiments, the local control system 42 may determine that the junction temperature $T_j$ (based on the baseplate temperature $T_{bp}$) exceeds the temperature threshold $T_{jmax}$ and may turn off the semiconductors of the solid-state circuit breaker 54. By turning off the one or more semiconductors, the local control system 42 may prevent damage to one or more downstream components.

At block 138, the local control system 42 may determine if there is a fault present in the industrial automation system 10. As discussed above, the local control system 42 may receive indication that the fault is present from one or more components in the industrial automation system 10. Furthermore, the local control system 42 may detect when one or more components in the industrial automation system 10 are not performing their respective functions correctly. In some embodiments, the local control system 42 may detect abnormal data from one or more components downstream from the solid-state circuit breaker 54. The abnormal data may include abnormal current data, abnormal voltage data, and/or abnormal temperature data.

At block 140, the local control system 42 may determine that there is a fault present in the industrial automation system 10 and may open the airgap disconnector 55 of the solid-state circuit breaker 54. The local control system 42 may determine that the one or more semiconductors are turned off and that there is no current flowing through the solid-state circuit breaker 54 prior to opening the airgap disconnector 55. The local control system 42 may determine a turn off time of the one or more semiconductors and/or the surge suppressor circuit to limit transient voltage and the dissipated energy in the one or more semiconductors and/or the surge suppressor circuit. In the case of the solid-state hybrid circuit beaker, the local control system 42 may determine that the one or more semiconductors are turned off and that a parallel switch in the solid-state hybrid circuit beaker prior to opening the airgap disconnector 55. The local control system 42 may automatically generate the signal to instruct the solid-state circuit breaker 54 to open the airgap disconnector 55 upon receiving indication of the fault in the one or more components of the industrial automation system 10. By opening the airgap disconnector 55, the solid-state circuit breaker 54 may create an open circuit and prevent the fault condition from impacting upstream and/or downstream components. It should be understood that when the local determines that the fault is not present, the local control system 42 may perform the operations starting at block 102.

It should be noted that during the initial run of the solid-state circuit breaker 54, the solid-state circuit breaker 54 may be using basic protection parameters, such as the one or more technology related parameters. Following the initial run of the solid-state circuit breaker 54, the solid-state circuit breaker 54 may use the one or more technology related parameters and the one or more application related parameters for protection during operation.

Figure 5:
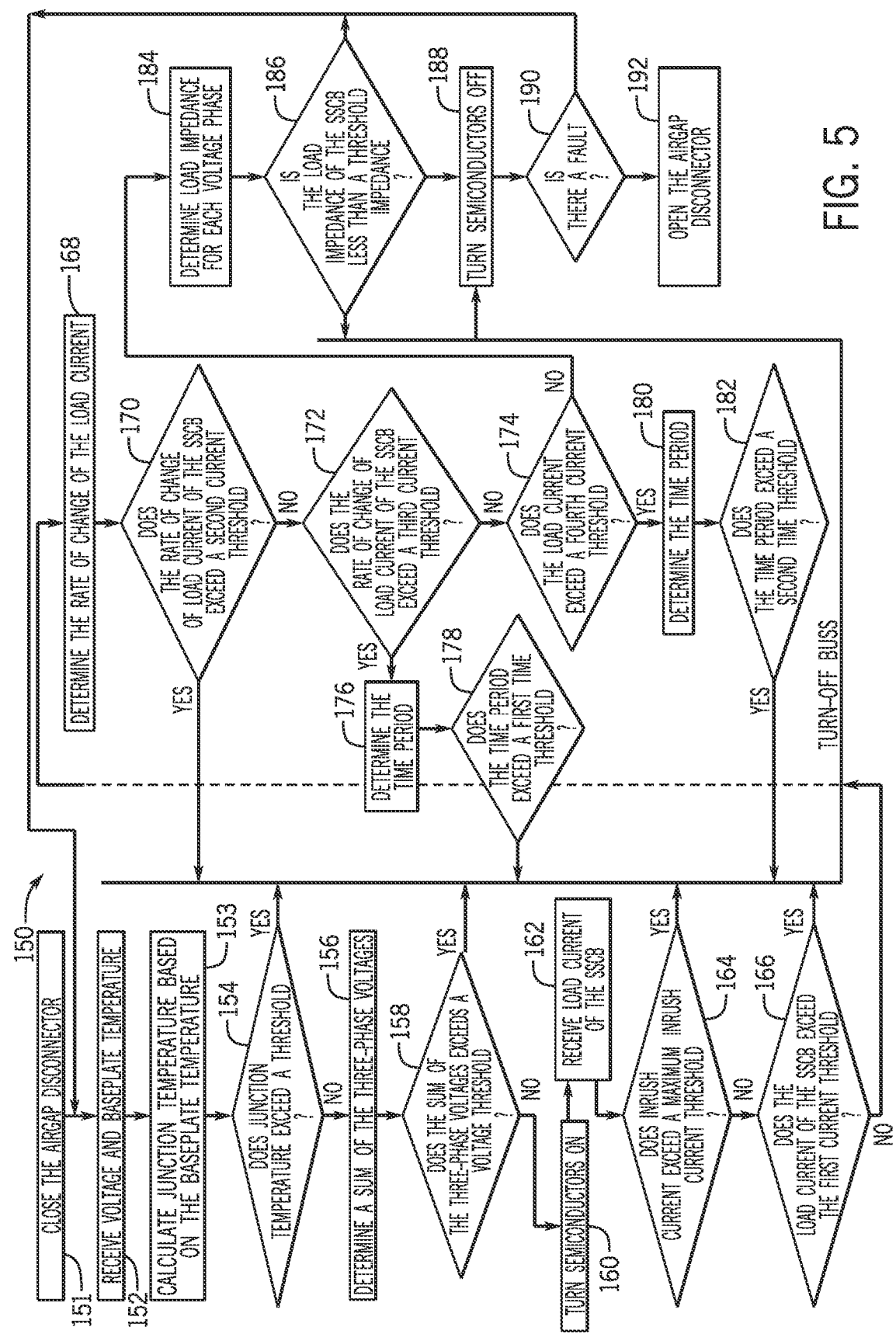
FIG. 5 illustrates a flowchart of a method for conducting normal operation of the solid-state circuit breaker, in accordance with an embodiment.

With the foregoing in mind, FIG. 5 illustrates a flowchart of a method 150 for conducting normal operation of the solid-state circuit breaker 54. Any suitable component that may control the components of the local control system 42 and/or the solid-state circuit breaker 54, such as the processor 62, may perform the method 150. In some embodiments, the method 150 may be implemented by executing instructions stored in a tangible, non-transitory, computer-readable medium, such as the memory 64 or storage 66, using the processor 62. While the method 150 is described using steps in a specific sequence, it should be understood that the present disclosure contemplates that the described steps may be performed in different sequences than the sequence illustrated, and certain described steps may be skipped or not performed altogether.

At block 151, the local control system 42 may send the signal to the sold state circuit breaker to close the airgap disconnector 55. As discussed above, the airgap disconnector 55 of the solid-state circuit breaker 54 may close the circuit and allow current to flow through the solid-state circuit breaker 54.

At block 152, the local control system 42 may receive the voltage u and the baseplate temperature $T_{bp}$ of the solid-state circuit breaker 54. The local control system 42 may receive the voltage u and the baseplate temperature $T_{bp}$ via the one or more sensors 59 that are coupled to the solid-state circuit breaker 54. That is, the one or more sensors 59 may be coupled to one or more components of the solid-state circuit breaker 54 and/or the bus 58 to receive the voltage u and/or the baseplate temperature $T_{bp}$.

At block 153, the local control system 42 may determine the junction temperature $T_j$ based on the baseplate temperature $T_{bp}$ of the solid-state circuit breaker 54. The local control system 42 may continuously determine the junction temperature $T_j$ during the method 100. At block 154, the local control system 42 may determine if the junction temperature $T_j$ exceeds a temperature threshold. As discussed above, the temperature threshold may be the maximum junction temperature $T_{jmax}$. The local control system 42 may compare the junction temperature $T_j$ to the maximum junction temperature $T_{jmax}$. In some embodiments, the temperature threshold $T_{jmax}$ may be updated by the local control system 42. By way of example, as the one or more semiconductors age, the properties of the one or more semiconductors may change and thus the temperature threshold $T_{jmax}$ may be updated to reflect the aging of the one or more semiconductors.

At block 156, the local control system 42 may determine the sum of the three-phase voltage $\Delta u_c$ of the solid-state circuit breaker 54. As discussed above, each phase voltage in the three-phase voltages may be determined by detecting the voltage at each pole in the solid-state circuit breaker 54. That is, each pole in the solid-state circuit breaker 54 may be associated with a particular phase in the three-phase voltage. As such, the sum of three-phase voltages $\Delta u_c$ may be determined by summing up the voltages at each pole.

At block 158, the local control system 42 may determine if the sum of the three-phase voltage $\Delta u_c$ exceeds the voltage threshold $\Delta u_{cmax}$. As discussed above, the voltage threshold may be the maximum of the sum of three-phase voltages $\Delta u_{cmax}$. The sum of instantaneous voltage in a three-phase voltage system should be equal to 0. As such, the local control system 42 may compare $\Delta u_c$ to $\Delta u_{cmax}$ to determine if there is a change in the three-phase voltage system.

At block 160, the local control system 42 may determine that the sum of the three-phase voltage does not exceed the voltage threshold and may send a signal to turn on the one or more semiconductors of the solid-state circuit breaker 54. As discussed above, the one or more semiconductors may be used by the starter to facilitate starting one or more motors in one or more industrial automation devices 20 in the industrial automation system 10. At block 116, the local control system 42 may receive a load current i of the solid-state circuit breaker 54. That is, the local control system 42 may receive the current flowing into the solid-state circuit breaker 54 via the load line from the electrical load 56 coupled to the solid-state circuit breaker 54, where the electrical load 56 may be one or more components (e.g., industrial automation devices 20 of the industrial automation system 10). The one or more sensors 59 coupled to the solid-state circuit breaker 54 may detect the load current i.

At block 162, the local control system 42 may receive the load current i of the solid-state circuit breaker 54. As discussed above, the local control system 42 may receive the current flowing into the solid-state circuit breaker 54 from electrical load 56 coupled to the solid-state circuit breaker 54. The one or more sensors 59 coupled to the solid-state circuit breaker 54 may detect the load current i.

At block 164, the local control system 42 may determine if an inrush current $\Delta i_c$ exceeds the maximum inrush current threshold or/and the $\Delta i_{cmax}$. As discussed above, when the one or more semiconductors turn on (e.g., when the starter turns on one or more motors), there may be excessive current flow experienced by the solid-state circuit breaker 54 from the power supply 52. The local control system 42 may determine the inrush current $\Delta i_c$ via the one or more sensors 59.

At block 166, the local control system 42 may determine that the inrush current $\Delta i_c$ does not exceed the maximum inrush current threshold and/or the $\Delta i_{cmax}$ and may determine if the load current I exceeds the first current threshold $I_{max2}$. As discussed above, the first current threshold $\Delta i_{cmax}$ may be associated with the one or more technology related parameters. That is, the first current threshold may be a predetermined value based on the properties of the one or more semiconductors. In some embodiments, the first current threshold $I_{max2}$ may be updated over time. By way of example, as the one or more semiconductors age, the properties of the one or more semiconductors may change and thus first current threshold $I_{max2}$ may be updated to reflect the aging of the one or more semiconductors.

At block 168, the local control system 42 may determine that the load current i does not exceed the first current threshold $I_{max2}$ and may determine the rate of change of the load current $d_{ic}/dt$ of the solid-state circuit breaker 54. As discussed above, the rate of change of the load current $d_{ic}/dt$ may be the change of the load current over a period of time. At block 170, the local control system 42 may determine if the rate of change of the load current $d_{ic}/dt$ of the solid-state circuit breaker 54 exceeds the second current threshold $d_{im2}/dt$. As discussed above, the second current threshold $di_{m2}/dt$ may be defined by the semiconductor technology. By way of example, the local control system 42 may ensure that the rate of change of the load current $d_{ic}/dt$ does not exceed double the nominal current within 2-3 microseconds.

At block 172, the local control system 42 may determine that the rate of change of the load current $d_{ic}/dt$ does not exceed the second current threshold $di_{m2}/dt$ and may determine if the rate of change of the load current $di_c/dt$ exceeds a third current threshold $di_{m1}/dt$. The third current threshold $di_{m1}/dt$ may be a value is derived by the local control system 42 from the rate of change of the load current $di_c/dt$. When the rate of change of the load current $di_c/dt$ has exceeded the third current threshold for a first threshold time period $\Delta t_{m1}$, the airgap disconnector 55 of the solid-state circuit breaker 54 may be opened. In some embodiments, the first threshold time period $\Delta t_{m1}$ may be between 200 microseconds (μs) and 50 μs, between 150 μs and 75 μs, between 125 μs and 90 μs, such as 100 μs. The rate $di_{m1}/dt$ and the first threshold time period $\Delta t_{m1}$ are based on the maximum rate of change of the load current $di_{cmax}/dt$ as shown in Equation 3 below:

$$\frac{di_{m1}}{dt} = k_i \cdot \frac{di_{cmax}}{dt} \qquad \text{Equation 3}$$

Referring to Equation 3, the factor $k_i$ describes a maximum deviation between a measured rate of change $di_{m1}/dt$ and the threshold $di_{cmax}/dt$ and takes into account the measurement tolerance and noise of the measured current. In some embodiments, a value of this factor k, may be 1.2.

At block 174, the local control system 42 may determine that the rate of change of the load current $di_c/dt$ does not exceed the third current threshold $di_c/dt$ and may determine if the load current i exceeds a fourth current threshold $I_{max1}$. The fourth current threshold $I_{max1}$ may be determined by the local control system 42 from the load current i. The fourth current threshold may indicate when the load current i has a thermal impact on the solid-state circuit breaker 54 and may lead to the airgap disconnector 55 of the solid-state circuit breaker 54 being opened when the load current i has exceeded the fourth current threshold for the period of time $\Delta t_{m1}$.

At block 176, the local control system 42 may determine that the rate of load change over the period of time does exceed the third current threshold and may determine a first time period $\Delta t_1$. As discussed above, when the rate of change of the load current has exceeded the third current threshold for the first time threshold $\Delta t_{m1}$, the airgap disconnector 55 of the solid-state circuit breaker 54 may be opened. In some embodiments, the period of time $\Delta t_{m1}$ may be between 200 microseconds (μs) and 50 μs, between 150 μs and 75 μs, between 125 μs and 90 μs, such as 100 μs. At block 178, the local control system 42 may determine if the first time period $\Delta t_1$ exceeds the first time threshold $\Delta t_{m1}$. That is, the local control system 42 may detect when the first time period $\Delta t_1$ exceeds the first time threshold $\Delta t_{m1}$. Furthermore, the local control system 42 may detect when the first time period $\Delta t_1$ does not exceed the first time threshold $\Delta t_{m1}$ and may perform block 174.

At block 180, the local control system 42 may determine that the load current i exceeds the fourth current threshold $I_{max1}$ and may determine a second time period $\Delta t_2$. As discussed above, the fourth current threshold $I_{max1}$ may indicate when the load current i has a thermal impact on the solid-state circuit breaker 54 and may lead to the airgap disconnector 55 of the solid-state circuit breaker 54 being opened when the load current i has exceeded the fourth current threshold $I_{max1}$ for a second time threshold $\Delta t_{m2}$. As such, at block 182, the local control system 42 may determine when the second time period $\Delta t_2$ exceeds a second time threshold $\Delta t_{m2}$. The second time threshold $\Delta t_{m2}$ may be set to be equal to the first time threshold $\Delta t_{m1}$. In some embodiments, the second time threshold $\Delta t_{m2}$ may be pre-determined by the local control system 42 based on the fourth current threshold $I_{max1}$. Furthermore, the local control system 42 may detect when the second time period $\Delta t_2$ exceeds the second time threshold $\Delta t_{m2}$. Furthermore, the local control system 42 may detect when the second time period $\Delta t_2$ does not exceed the second time threshold $\Delta t_2$ and may perform block 174.

At block 184, the local control system 42 may determine that the load current i does not exceed the fourth current threshold $I_{max1}$ and may determine a load impedance $Z_L$ for each voltage phase. Load impedance is present when one or more components coupled to the solid-state circuit breaker 54 includes additional elements (e.g., inductive elements, capacitive elements) other than resistive elements. As such, it is important to determine the load impedance $Z_L$ in each phase in the three-phase voltage system. The load impedance $Z_L$ may be determined by the Equation 3 below:

$$Z_L = \frac{u}{i} \qquad \text{Equation 4}$$

That is, the load impedance $Z_L$ may be determined based on the voltage u and the load current i. At block 186, the local control system 42 may determine if the load impedance $Z_L$ is below the load impedance threshold $Z_{cmin}$. By way of example, the local control system 42 may compare the load impedance $Z_L$ to 90% of the load impedance threshold $Z_{cmin}$. When the local control system 42 determines that the load impedance $Z_L$ is below the load impedance threshold $Z_{cmin}$, the local control system 42 may perform block 152.

At block 188, the local control system 42 may determine that the load impedance $Z_L$ is above the load impedance threshold and may turn off the one or more semiconductors off. In some embodiments, the local control system 42 may turn off the one or more semiconductors when the local control system 42 determines that the baseplate temperature exceeds the temperature threshold. Furthermore, the local control system 42 may turn off the one or more semiconductors when the local control system 42 determines that the sum of the three-phase voltages exceeds the voltage threshold. Additionally, the local control system 42 may turn off the one or more semiconductors when the local control system 42 determines that the inrush current exceeds the maximum inrush current threshold, that the load current exceeds the first current threshold, and/or that the rate of change of the load current exceeds the second current threshold. Moreover, the local control system 42 may turn off the one or more semiconductors when the local control system 42 determines that the first time period exceeds a first time threshold and/or that the second time period exceeds the second time threshold.

At block 190, the local control system 42 may determine if a fault is present in the industrial automation system 10. As discussed above, the local control system 42 may receive indication that the fault is present from one or more components in the industrial automation system 10. Furthermore, the local control system 42 may detect when one or more components in the industrial automation system 10 are not performing their respective functions correctly. In some embodiments, the local control system 42 may detect abnormal data from one or more components upstream and/or from the solid-state circuit breaker 54. The abnormal data may include abnormal current data, abnormal voltage data, and/or abnormal temperature data.

At block 192, the local control system 42 may determine that the fault is present in the industrial automation system 10 and may open the airgap disconnector 55. The local control system 42 may determine that the one or more semiconductors are turned off and that there is no current flowing through the solid-state circuit breaker 54 prior to opening the airgap disconnector In the case of the solid-state hybrid circuit beaker, the local control system 42 may determine that the one or more semiconductors are turned off and that a parallel switch in the solid-state hybrid circuit beaker prior to opening the airgap disconnector 55. The local control system 42 may automatically generate the signal to instruct the solid-state circuit breaker 54 to open the airgap disconnector 55 upon receiving indication of the fault in the one or more components of the industrial automation system 10. By opening the airgap disconnector 55, the solid-state circuit breaker 54 may create an open circuit and prevent the fault condition from impacting upstream and/or downstream components. It should be understood that when the local determines that the fault is not present, the local control system 42 may perform the operations starting at block 102.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A system, comprising: a solid-state circuit breaker configured to couple between a power supply and an electrical load; one or more sensors configured to measure one or more properties associated with the solid-state circuit breaker, the electrical load, the power supply, or any combination thereof, a control system configured to communicatively couple to the one or more sensors, wherein the control system is configured to: send a first signal to the solid-state circuit breaker, wherein the first signal is configured to cause the solid-state circuit breaker to close an airgap disconnector of the solid-state circuit breaker; receive a first set of data from the one or more sensors; send a second signal to the solid-state circuit breaker, wherein the second signal is configured to cause the solid-state circuit breaker to turn on one or more semiconductors in the solid-state circuit breaker; receive a second set of data from the one or more sensors after the one or more semiconductors are turned on; generate a baseline profile associated with one or more operations of the electrical load based on the first set of data and the second set of data; receive a third set of data from the one or more sensors; determine that a fault associated with the solid-state circuit breaker, the electric load, the power supply, or any combination thereof is present based on a difference between the baseline profile and the third set of data; and sending a third signal to the solid-state circuit breaker in response to determining that the fault is present, wherein the third signal is configured to cause the solid-state circuit breaker to open the airgap disconnector.

2. The system of claim 1, wherein the one or more sensors comprise one or more temperature sensors, one or more current sensors, one or more resistance sensors, one or more voltage sensors, or any combination thereof.

3. The system of claim 1, wherein the baseline profile comprises a set of parameters associated with one or more operational characteristics of the one or more semiconductors.

4. The system of claim 3, wherein the set of parameters are determined based on one or more temperature ratings associated with the one or more semiconductors.

5. The system of claim 3, wherein the set of parameters comprises:
   a first current threshold determined based on one or more temperature ratings associated with the one or more semiconductors, one or more respective heatsinks associated with the one or more semiconductors, or both;
   a second current threshold representative of a maximum nominal current in a time period; and
   a maximum junction S temperature determined based on the one or more thermal limitations of the one or more semiconductors, one or more respective heatsinks associated with the one or more semiconductors, or both.

6. The system of claim 3, wherein the set of parameters are associated with the electrical load, an overcurrent rating associated with the solid-state circuit breaker, a maximum temperature associated with the solid-state circuit breaker, a maximum voltage associated with the solid-state circuit breaker, or any combination thereof.

7. The system of claim 6, wherein the set of parameters comprise one or more expected change of current values, one or more expected inrush currents during initialization, a nominal current value, a nominal voltage value, one or more expected changes in electrical properties at various time periods with respect to other operating devices, rate of change of the load current, or any combination thereof.

8. The system of claim 1, wherein the electrical load comprises one or more industrial automation devices.

9. The system of claim 1, wherein the control system is configured to:
   send the second signal to turn on the one or more semiconductors at a first time;
   determine dissipated energy after sending the second signal to the solid-state circuit breaker;
   send a fourth signal to turn off the one or more semiconductors at a second time after the first time; and
   determine the dissipated energy after sending the fourth signal to the solid-state circuit breaker.

10. The system of claim 1, wherein the solid-state circuit breaker comprises a surge suppressor circuit, wherein the control system is configured to:
   determine the dissipated energy in the surge suppressor circuit; and
   determine a turn-off time to limit transient voltage and the dissipated energy in the one or more semiconductors and the surge suppressor circuit.

11. The system of claim 1, wherein the control system is configured to perform a self-diagnostic of the solid-state circuit breaker, wherein the self-diagnostic comprises:
   identifying one or more characteristics of the electrical load; and
   determining a lifetime of one or more components of the solid-state circuit breaker based on the one or more characteristics of the electrical load and the solid-state circuit breaker.

12. A method, comprising:
   receiving, via at least one processor, a first set of operational parameters that correspond to one or more semiconductor devices of a solid-state circuit breaker;
   sending, via the at least one processor, a first command to the solid-state circuit breaker in response to the first set of operational parameters exceeding a first set of thresholds, wherein the first command is configured to cause the one or more semiconductor devices to turn off;
   sending, via the at least one processor, a second command to the solid-state circuit breaker in response to the first set of operational parameters being equal to or less than the first set of thresholds, wherein the second command is configured to cause the one or more semiconductor devices to turn on;
   receiving, via the at least one processor, a second set of operational parameters that correspond to one or more electrical properties associated with an operation of the solid-state circuit breaker coupled to a load device after the one or more semiconductors are turned on; and
   generating, via the at least one processor, a baseline profile representative of the first set of operational parameters and the second set of operational parameters.

13. The method of claim 12, comprising:
   determining, via the at least one processor, that a fault associated with the solid-state circuit breaker, the load device, a power supply configured to couple to the solid-state circuit breaker, or any combination thereof is present based on the baseline profile and a third set of operational parameters; and
   sending, via the at least one processor, a fourth command to the solid-state circuit breaker in response to determining that the fault is present, wherein the fourth command is configured to cause the solid-state circuit breaker to open an airgap disconnector of the solid-state circuit breaker.

14. The method of claim 13, comprising:
   receiving, via at least one processor, the third set of operational parameters that correspond to one or more semiconductor devices of the solid-state circuit breaker; and
   sending, via the at least one processor, a third command to the solid-state circuit breaker based on a comparison between the third set of operational parameters and the baseline profile, wherein the third command is configured to cause the one or more semiconductor devices to turn off.

15. The method of claim 14, comprising:
   receiving, via the at least one processor, the third set of operational parameters that correspond to the one or more electrical properties associated with the operation of the solid-state circuit breaker coupled to the load device; and
   sending, via the at least one processor, a third command to the solid-state circuit breaker based on a comparison between the third set of operational parameters and the baseline profile, wherein the third command is configured to cause the one or more semiconductor devices to turn off.

16. The method of claim 12, wherein the first set of operational parameters comprises a nominal voltage value, one or more baseplate temperatures associated with the one or more semiconductors, a load current, or any combination thereof.

17. The method of claim 12, wherein the second set of operational parameters comprises an inrush current, a rate of change of load current, a load impedance, or any combination thereof.

18. The method of claim 12, wherein the third set of operational parameters comprises an additional inrush current, an additional rate of change of load current, an additional load impedance, or any combination thereof, wherein the additional inrush current, the additional rate of change of load current, the additional load impedance or any combination thereof are each determined after the baseline profile is generated.

19. A non-transitory, machine-readable medium, comprising machine-readable instructions that, when executed by one or more processors, cause the one or more processors to:
   receive a baseline profile that corresponds to one or more semiconductor devices of a solid-state circuit breaker and to one or more electrical properties associated with an operation of the solid-state circuit breaker coupled to a load device;
   receive a first set of operational parameters that correspond to the one or more semiconductor devices of the solid-state circuit breaker;
   send a first command to the solid-state circuit breaker based on a comparison between the first set of operational parameters and the baseline profile, wherein the first command is configured to cause the one or more semiconductor devices to turn off;
   send a second command to the solid-state circuit breaker based on the comparison between the first set of operational parameters and the baseline profile, wherein the second command is configured to cause the one or more semiconductor devices to turn on;
   receive a second set of operational parameters that correspond to the one or more electrical properties associated with the operation of the solid-state circuit breaker coupled to the load device; and
   send a third command to the solid-state circuit breaker based on a comparison between the second set of operational parameters and the baseline profile, wherein the third command is configured to cause the one or more semiconductors devices to turn off.

20. The non-transitory, machine-readable medium of claim 19, wherein the machine-readable instructions that, when executed by the one or more processors, cause the one or more processors to:
   determine a first period of time associated with the one or more electrical properties, wherein the first period of time corresponds to an amount of time that a fault is present, and wherein the first period of time is determined based on the baseline profile; and
   send the third command to the solid-state circuit breaker in response to the first period of time being greater than or equal to a maximum amount of time, and wherein the maximum amount of time is determined based on the baseline profile.

21. The non-transitory, machine-readable medium of claim 19, wherein the machine-readable instructions that, when executed by the one or more processors, cause the one or more processors to update the baseline profile based on the first set of operational parameters and the second set of operational parameters.

22. The non-transitory, machine-readable medium of claim 19, wherein the first set of operational parameters comprises a nominal voltage value, a baseplate temperature associated with the one or more semiconductors, a load current, or any combination thereof.

23. The non-transitory, machine-readable medium of claim 19, wherein the second set of operational parameters comprises an inrush current, a rate of change of load current, a load impedance.

24. The non-transitory, machine-readable medium of claim 19, wherein the machine-readable instructions that, when executed by the one or more processors, cause the one or more processors to:
- determine that a fault associated with the solid-state circuit breaker, the load device, a power supply configured to couple to the solid-state circuit breaker, or any combination thereof is present based on the baseline profile, the first set of operational parameters, and the second set of operational parameters; and
- send a fourth command to the solid-state circuit breaker in response to determining that the fault is present, wherein the fourth command is configured to cause the solid-state circuit breaker to open an airgap disconnector of the solid-state circuit breaker.

\* \* \* \* \*